Dec. 24, 1968 R. A. CEDEL 3,417,612

CALIBRATING DIAL MOUNTING FOR FLOW METERS

Filed Oct. 23, 1965 2 Sheets-Sheet 1

INVENTOR
RICHARD A. CEDEL
BY
Andrus & Starke
Attorneys

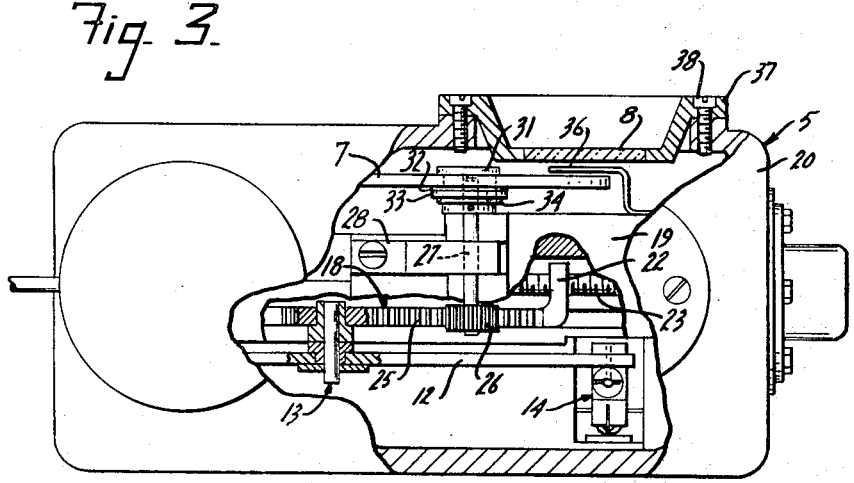
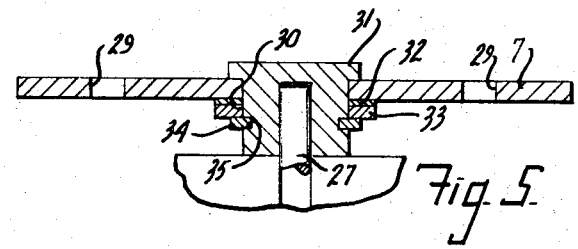
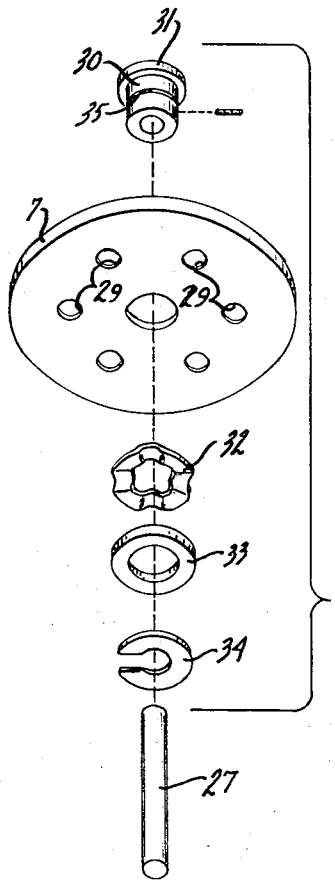
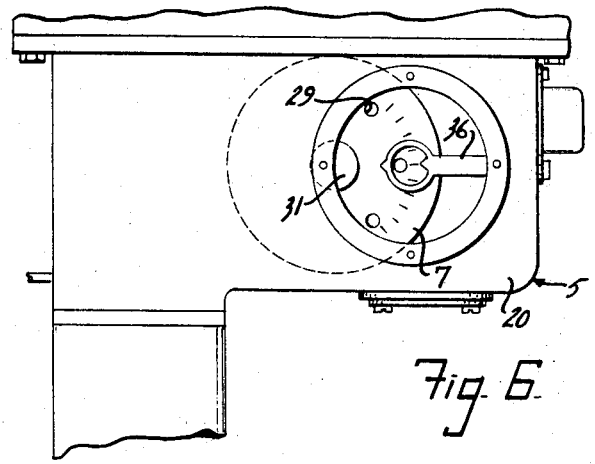

United States Patent Office 3,417,612
Patented Dec. 24, 1968

3,417,612
CALIBRATING DIAL MOUNTING FOR FLOW METERS
Richard A. Cedel, Erie, Pa., assignor to A. O. Smith Corporation, Milwaukee, Wis., a corporation of New York
Filed Oct. 23, 1965, Ser. No. 503,312
6 Claims. (Cl. 73—272)

ABSTRACT OF THE DISCLOSURE

A volumetric flow meter includes a temperature and coefficient of expansion compensation system to record the volumetric flow to a selected base temperature. A pivotal lever is interconnected between a temperature responsive bellows and a variable ball type transmission unit to continuously adjust the transmission rate in accordance with the actuation of the bellows unit. The relative degree or ratios of movement of the opposite ends of a lever as a result of temperature changes varies in accordance with the setting of the pivot point. The operator adjusts the pivot point in accordance with the known specific gravity of the material being metered. The adjustment means includes a visual calibrating dial to permit rapid and accurate positioning of the pivot point. The dial is clamped to a mounting hub by a flat annular spring washer disposed between suitable flange on the mounting hub and the dial proper. The dial is provided with circumferential spaced openings such that at least one opening is always within a dial window such that with the window removed, the dial can be rotated by inserting a suitable pointed tool within one of the small openings to reset the dial. The spring washer provides sufficient frictional forces to insure that the dial is not inadvertently moved and accurately follows the positioning of the pivot point. However, the dial may be independently moved on the mounting hub for calibration by use of the proper tool.

---

This invention relates to a calibrating dial mounting for the calibrating dial of a volumetric flow meter employing temperature and coefficient of expansion compensation to record the volumetric flow to a selected base temperature.

Gasoline and similar products are often transmitted through suitable flow or pipe lines and volumetric flow meters are inserted in the line to automatically record and maintain accurate records of the volume of flow. Generally, the volumetric responsive flow meter establishes a mechanical output in accordance with the volumetric flow through the meter with the mechanical output coupled through a temperature and coefficient of expansion compensator to the recorder to record the volume to a base temperature, generally 60 degrees F. in the United States.

The volume of the metered liquid varies with its temperature because of the expansion and contraction characteristics. Further, the amount of expansion and contraction for any given temperature change varies with the specific gravity of the liquid. A highly satisfactory temperature and coefficient expansion compensator is disclosed in U.S. Patents 3,088,317 and 3,024,665 to W. E. Steen. As more fully disclosed therein, a pivotal lever is interconnected between a temperature responsive bellows and a variable ball type transmission unit to continuously adjust the transmission unit in accordance with the actuation of the bellows unit. The transmission unit controls the drive ratio between the meter and the recorder. A temperature sensing means is located in the flow line and connected to the bellows unit to position the bellows unit in accordance with the liquid flowing through the line. The relative degree or ratios of movement of the opposite ends of the lever as a result of temperature changes varies in accordance with the setting of the pivot point. The operator adjusts the pivot point in accordance with the known specific gravity of the material being metered. The adjustment means includes a visual calibrating dial to permit rapid and accurate positioning of the pivot point.

Due to manufacturing tolerances required for economical production, the reproducibility of the precise movement from unit to unit is not obtained. The bulb and bellows assembly may have a slightly larger or smaller movement than the desired movement with the pivot block set for a specific material.

During the assembly of the unit and prior to shipment, well known test procedures are employed to calibrate the device by slight movement of the pivot point to compensate for such manufacturing tolerances. Although this is satisfactory, the movement of the pivot point from the design is accompanied with a corresponding movement of the calibrating dial which then indicates a different gravity selection than that actually intended. This requires that the housing and dial mounting be disassembled and the dial reset. This procedure is time consuming and expensive and further during reassembly the corrected adjustment may be destroyed; requiring further testing and correction of the assembly.

The present invention is particularly directed to a very simple and novel concept in the construction and mounting of the dial to permit adjustment of the dial without complete disassembly of the unit. The dial is mounted to an element of the mechanism for positioning in accordance with the manual positioning of the pivot point to provide an indication of the gravity setting. A removable window portion or viewing cover is provided through which at least a portion of the dial is visually read. In accordance with the present invention, however, the dial is slidably mounted to the element and secured to the element through a suitable resilient connection. During the assembly and testing of the apparatus, the calibrating mechanism is adjusted to provide accurate outputs in accordance with normal test procedures. If necessary, the dial can be readily reset to a proper position by removing of the dial window and turning of the dial against the frictional forces which permit movement of the dial independently of the shaft and associated mechanism.

In a preferred construction, the dial is clamped to a mounting hub by a flat annular spring disposed between suitable abutting means on the mounting means and the dial proper. The dial is provided with circumferential spaced openings such that at least one opening is always within the dial window such that with the window removed, the dial can be rotated by inserting a suitable pointed tool within one of the small openings to reset the dial. The spring washer provides sufficient frictional forces to insure that the dial is not inadvertently moved and accurately follows the positioning of the pivot point. However, the dial may be independently moved on the mounting hub for calibration by use of the proper tool.

The drawings furnished herewith illustrate a preferred construction of the present invention in which the above advantages and features are clearly set forth as well as others which will be clear from the following description.

In the drawings:

FIG. 3 is a side elevational view of the pivotal lever connection and of the improved calibrating dial mounting;

FIG. 4 is an enlarged perspective view of the calibrating dial mounting;

FIG. 5 is an enlarged sectional view through the dial mounting; and

FIG. 6 is a top elevational view of FIG. 3.

Figure 1:
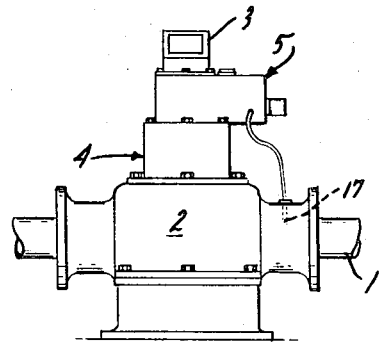
FIG. 1 is an elevational view of a liquid flow meter adapted to drive a suitable recorder through a compensating mechanism incorporating the dial adjustment of the present invention.
Figure 2:
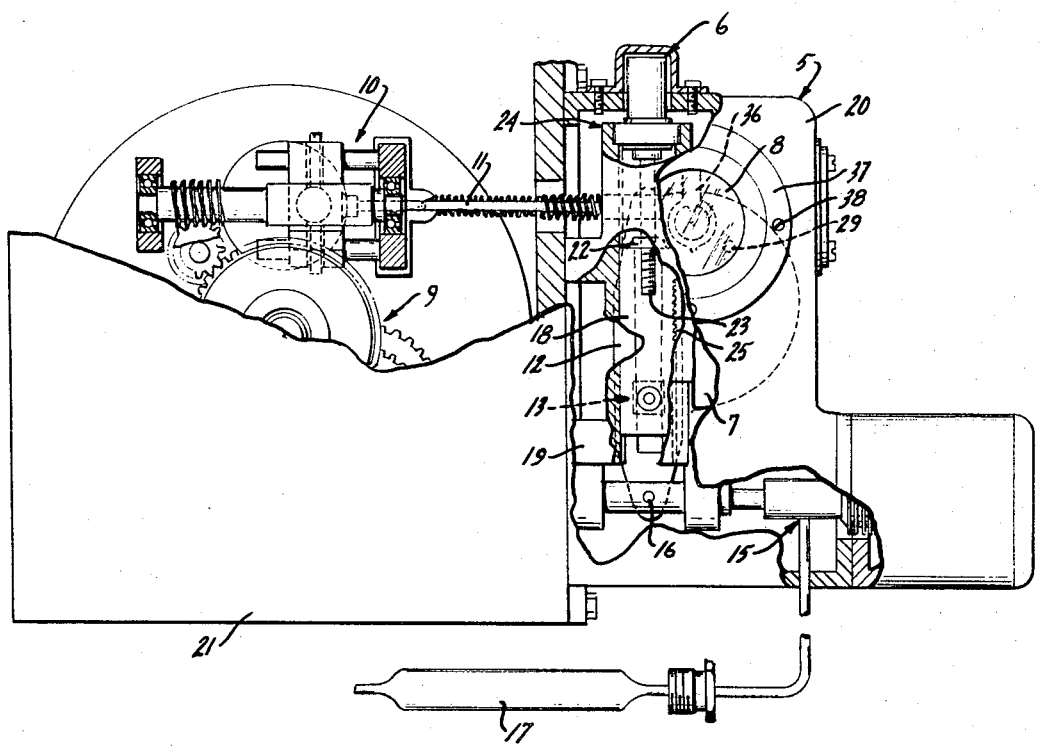
FIG. 2 is a top view of the compensating mechanism connected between the meter and the recorder.

Referring to the drawings and particularly to FIGS. 1 and 2, a flow line 1 is illustrated which is adapted to carry liquids of different specific gravity. A meter 2 is connected in series in line 1 and is adapted to establish a rotational mechanical output proportional to the volumetric liquid flowing through the meter. A recorder 3 is shown mounted to the top of the meter 2 and is connected through an adjustable ratio drive 4 to the mechanical output of the meter. The adjustable ratio drive 4 includes a temperature responsive assembly 5 to automatically establish temperature compensation such that the recording of flow is to a selected base temperature. A manual adjustment knob 6 is provided for changing the temperature response in accordance with the specific gravity of the fluid flowing through the meter 2. A calibrating dial 7 graduated in units of specific gravity forms a part of the adjustment means and is disposed beneath a viewing window 8 to permit visual reading of the specific gravity setting.

The meter 2 may be any suitable volumetric responsive meter; for example, as shown in U.S. Patent 2,362,778 to W. E. Steen and no further description or illustration is given. Similarly, the recorder 3 is of any suitable construction adapted to receive a rotating input to provide a visual reading or other record of the flow and no further description is given.

The meter 2 is connected to the recorder 3 through the adjustable ratio drive 4 which in the illustrated embodiment of the invention corresponds to that more fully described in U.S. Patents 3,024,665 and 3,088,317 and is described herein only in sufficient detail to clearly describe the present invention. Generally, the drive 4 includes a planetary or differential transmission system 9, partially shown in FIG. 2, and a ball integrator transmission 10, particularly shown in U.S. Patent 3,024,665, connecting the planetary or differential transmission 9 to a rotating output of the meter 2 for adjustment of the drive ratio between the output of the meter 2 and the input to the recorder 3.

The setting of the ball integrator transmission 10 is obtained through the reciprocal movement of a ball positioning shaft 11 which is connected to a temperature responsive assembly 5, more fully described and shown in U.S. Patent 3,088,317; with the exception of the improved and novel mounting of the calibrating dial 7 which particularly forms the subject matter of the present invention.

Referring to FIGS. 2 and 3, the compensating assembly generally includes a pivoted lever 12 intermediately pivoted on a pivot block unit 13. One end of the lever 12 is pinned to the ball transmission positioning rod or shaft 11 as at 14 and the opposite end is pinned to a spring loaded bellows unit 15, as at 16. A temperature sensing bulb 17 is suitably mounted within the line 1 and coupled to actuate bellows unit 15. The liquid within the bulb 17 expands and contracts in accordance with the temperature variation of the liquid and provides a corresponding accurate movement of the bellows unit 15 which is transmitted to the lever 12. The lever 12 pivots about the pivot block unit 13 causing reciprocal movement of the ball positioning shaft 11 and thereby controls the effective drive coupling of the meter 2 to the recorder 3. As shown in FIGS. 2 and 3, the pivot block is secured to a carriage 18 which is slidably mounted within a suitable fixed frame 19 in the housing 20 for movement perpendicularly of the rod 11. The housing 20 is a cup-shaped member bolted or otherwise secured to the side of the main ratio drive housing 21 to enclose the temperature responsive assembly 5. A threaded ear or lug 22 is formed on the one end of carriage 18 and a positioning shaft 23 is threaded into the lug. The shaft 23 is rotatably supported in a suitable bearing 24 which prevents axial movement of the shaft and extends outwardly terminating in the manual control knob 6. Rotation of the shaft 23 causes the lug to move axially on the shaft and to correspondingly reposition the carriage 18 and the pivot block unit 13. The back edge of the carriage 18 is provided with a rack portion 25 which drives a mating pinion 26 secured to the inner end of a calibrating dial shaft 27.

The dial shaft 27 is rotatably mounted in a recess in frame 19 by a leaf spring 28 to resiliently load the mounting of the pinion and rack portion. The dial end of the shaft 27 terminates within the housing 20 adjacent the viewing window 8 and has the calibrating dial secured thereto.

The dial 7 is disc-like having a central mounting opening and a plurality of reset openings 29 equicircumferentially spaced about the mounting opening.

The outer face of the calibrating dial 7 is provided with a plurality of indicia related to the specific gravity of the materials to be metered. The dial 7 is secured to the end of the shaft 27, as follows.

A dial hub 30 slips over the outermost end of the shaft 27 and is releasably secured thereto by a small set screw or the like. The diameter of the hub 30 generally corresponds to the diameter of the dial mounting opening with the end of the dial hub provided with an outer clamping flange 31. The dial 7 fits over the dial hub in abutting relation with the clamping flange 31. A flat annular spring 32 is disposed in engagement with the back surface of the dial 7 and resiliently urges the dial outwardly into engagement with the flange 31. The spring 32 is held in place by a backing washer 33 and a snap ring 34 abutting the back of the washer and disposed within a suitable groove 35 in the dial hub. The spring 32 creates sufficient frictional forces to maintain rotation of the calibrating dial 7 with the dial shaft 27 and therefore with the positioning of the pivot block unit 13 through movement of the carriage 18. The force however is also such that the dial 7 can be moved without movement of the coupled dial shaft 27 and the pivot block unit 13. A small pointer 36 is fixed to the fixed frame 19 and overlies the periphery of the dial beneath the viewing window 8. The device is assembled such that a reading is provided with the pivot block at a predetermined position which theoretically establishes a proper ratio of movement of the ball positioning shaft 11 in response to temperature responsive movement of the bellows unit 15. The viewing window opening is aligned with the pointer and the adjacent portion of the dial 7. A cover mounting frame 37 is removably secured as by bolts 38 or the like to the housing 20 with the glass window or cover 8 disposed within a central opening. The cover opening 38 is offset to the one side of the dial shaft 27 but is sufficiently large to include at least one of the plurality of equicircumferentially spaced small openings 29 in the dial 7 at all times. Therefore, the dial 7 may be repositioned after assembly by simply removing of the viewing window 8 and inserting a pointed tool, pencil or the like into the exposed opening or hole 29 for rotating of the dial 7 on the hub 30.

After complete assembly, the device is tested with known liquids and temperatures to insure accurate response setting of the pivot block unit 13. If the readings obtained do not correspond to known proper readings, the knob 6 is adjusted to reset the pivot block unit 13 to obtain the desired accurate and precise metering. As a result of repositioning of the pivot block unit 13, the calibrating dial 7 will of course be offset with respect to the pointer 36 from the proper reading.

In accordance with the present invention, the testing operator need only remove the clamping bolts 38 and the viewing window 8 to obtain access to the exposed portion of the calibrating dial 7 which will include at least one of the resetting holes 29. By insertion of a pointed tool into the dial hole 29 within the viewing window opening, the test operator resets the dial 7 to read the proper specific gravity without removal of the enclosing housing 20 from the main housing 21 or the disassembly of the dial mounting means. During the manual positioning of the pivot block unit 13 however the frictional forces established by the small flat spring 32 maintains accurate and corresponding movement of the dial 7 with the movement of the pinion 26.

The present invention thus porvides a very simple and reliable means for repositioning and adjusting of the calibrating mechanism of a gravity selector assembly.

Various modes of carrying out the invention are contemplated as being within the scope of the following claims particularly pointing out and distinctly claiming the subject matter which is regarded as the invention.

I claim:

1. In a temperature compensating meter assembly having an adjustable means for setting an output control means in accordance with a liquid to be metered, the improvement comprising, a shaft rotatably mounted for angular positioning in accordance with the positioning of the adjusting means, a radial wall means secured to the shaft, a calibrating dial rotatably supported on said shaft adjacent the wall means, and resilient means secured to the shaft and resiliently forcing the dial to said wall means to establish movement of the dial with said element and to permit movement of the dial independently of said element.

2. In a temperature compensating meter assembly having an adjustable means for setting an output control means in accordance with a liquid to be metered and a calibrating dial coupled to a shaft rotatable with the adjusting means, the improvement in the coupling of the dial to the output control means comprising a hub releasably secured to the end of the shaft, said hub having a clamping flange, a dial having a central opening corresponding to the diameter of the hub and positioned on the hub abutting the flange, said dial having a plurality of circumferentially spaced reset openings spaced outwardly of the mounting opening, an annular flat spring disposed on the hub and held in engagement with the dial for resiliently urging the dial into frictional clamping engagement with the flange, and a housing assembly enclosing the dial and hub and having a viewing opening aligned with at least a portion of the dial, said dial and opening being constructed to align at least one of said reset openings within the opening for all dial positions.

3. In a temperature compensating meter assembly having an adjustable means for setting an output control means in accordance with a liquid to be metered and a calibrating dial coupled to a shaft rotatable with the adjusting means, the improvement in the coupling of the dial to the output control means comprising a hub releasably secured to the end of the shaft, said hub having a clamping flange and a groove spaced from the flange, a dial having a central opening corresponding to the diameter of the hub and positioned on the hub abutting the flange, said dial having a plurality of circumferentially spaced reset openings spaced outwardly of the mounting opening, an annular flat spring disposed on the hub in engagement with the dial for resiliently urging the dial into frictional clamping engagement with the flange, a snap ring disposed within the groove, a washer disposed between the snap ring and the flat spring to stress the spring into resilient engagement with the dial, a housing assembly enclosing the dial and hub and having a viewing opening aligned with at least a portion of the dial, said dial and opening being constructed to align at least one of said reset openings within the opening for all dial positions, and a transparent cover releasably secured over the opening to permit access to a reset opening within the viewing opening.

4. In a temperature compensating meter assembly having an adjustable means for setting an output control means in accordance with a liquid to be metered and a calibrating dial coupled to a rotating shaft rotated in accordance with the movement of the adjusting means, the improvement comprising means to rotatably support the dial on said shaft, and resilient means resiliently clamping the dial to said shaft to establish movement of the dial with said shaft and to permit independent direct movement of the dial independently of said adjusting means whereby said dial can be adjusted to provide a proper indication of the material being metered.

5. In the improvement of the temperature compensating meter assembly of claim 4 having a dial hub secured to the shaft and having a clamping flange, said dial being rotatably mounted on the hub and being urged into frictional engagement with the clamping flange of said hub by said resilient means.

6. In a temperature compensating meter assembly having an adjustable means for setting an output control means in accordance with a liquid to be metered and a calibrating dial coupled to a rotating shaft rotated in accordance with the movement of the adjusting means, the improvement comprising means to rotatably support the dial on said shaft, and resilient means resiliently clamping the dial to said shaft to establish movement of the dial with said shaft and to permit independent direct movement of the dial independently of said adjusting means whereby said dial can be adjusted to provide a proper indication of the material being metered, said dial including means for moving of the dial independently of the element.

References Cited

UNITED STATES PATENTS 2,438,934  4/1948  Marsh _____ 73—233
3,088,317  5/1963  Steen _____ 73—233

RICHARD C. QUEISSER, *Primary Examiner.*

EDWARD D. GILHOOLY, *Assistant Examiner.*

U.S. Cl. X.R.

73—233